(12) United States Patent
Eubanks et al.

(10) Patent No.: US 7,306,091 B2
(45) Date of Patent: Dec. 11, 2007

(54) TAPERED SPLINE ROLLER FOR CURVED ROLLER CONVEYOR

(75) Inventors: Ronald L. Eubanks, Erlanger, KY (US); John Erwin Treft, Fairfield, OH (US)

(73) Assignee: TKF Incorporated, Cincinnati, OH (US)

( * ) Notice: Subject to any disclaimer, the term of this patent is extended or adjusted under 35 U.S.C. 154(b) by 0 days.

(21) Appl. No.: 11/268,335

(22) Filed: Nov. 7, 2005

(65) Prior Publication Data

US 2006/0096842 A1 May 11, 2006

Related U.S. Application Data

(60) Provisional application No. 60/625,512, filed on Nov. 5, 2004.

(51) Int. Cl.
*B65G 13/07* (2006.01)
(52) U.S. Cl. .................................. 198/787; 198/790
(58) Field of Classification Search ............... 198/787, 198/790, 781.03, 781.09
See application file for complete search history.

(56) References Cited

U.S. PATENT DOCUMENTS

| | | | | |
|---|---|---|---|---|
| 871,340 A | * | 11/1907 | Hrdina | ............... 198/787 |
| 1,897,352 A | | 2/1933 | Wilson et al. | |
| 1,959,157 A | * | 5/1934 | Eggleston | ............ 198/787 |
| 2,055,053 A | * | 9/1936 | Stokes | ............... 198/787 |
| 3,026,993 A | * | 3/1962 | Penn | ................ 198/787 |
| 3,618,418 A | | 11/1971 | Chittenden | |
| 3,902,589 A | * | 9/1975 | Bylsma | ............... 198/790 |
| 3,961,700 A | | 6/1976 | Fleischauer | |
| 4,013,166 A | * | 3/1977 | Weady et al. | ........... 198/835 |
| 4,019,627 A | * | 4/1977 | Eggert et al. | .......... 198/786 |
| 4,248,482 A | | 2/1981 | Truszczinski | |
| 4,583,637 A | | 4/1986 | Ferguson | |
| 4,887,707 A | | 12/1989 | Harms | |
| 5,038,925 A | | 8/1991 | Chrysler | |
| 5,088,596 A | * | 2/1992 | Agnoff | ............... 198/788 |
| 5,159,880 A | * | 11/1992 | Mugnier | ............. 104/87 |

(Continued)

FOREIGN PATENT DOCUMENTS

DE    3124320 A1    1/1983

(Continued)

*Primary Examiner*—Mark A. Deuble
(74) *Attorney, Agent, or Firm*—Daniel F. Nesbitt; Hasse & Nesbitt LLC

(57) ABSTRACT

A tapered spline conveyor roller, and a curved conveyor roller assembly using a plurality of the tapered spline rollers. The tapered spline roller has a cylindrical barrel and an inner and an outer drive portion that is formed of a plurality of parallel, radially-disposed, tapered splines about the circumference of the barrel portion. The splines can be tapered inwardly at a taper angle toward the center of the roller, along the length of the spline, from the first end toward the second end of the roller. A belt connects and engages the tapered splines of the drive portions of adjacent rollers, for rotationally coupling the rollers. The connecting belt typically has an inner surface having spaced-apart ribs for engaging the slots disposed between the tapered splines. The tapered splines of the two drive portions of adjacent rollers is provided with a taper angle that is one-half of the angle that is formed between the centerlines of the adjacent rollers.

20 Claims, 3 Drawing Sheets

U.S. PATENT DOCUMENTS

| | | |
|---|---|---|
| 5,332,083 A | 7/1994 | Axmann |
| 5,348,140 A * | 9/1994 | Clos .......................... 198/790 |
| 5,413,209 A * | 5/1995 | Werner ....................... 198/500 |
| 5,470,293 A * | 11/1995 | Schonenberger ............. 482/54 |
| 5,558,205 A | 9/1996 | Helgerson et al. |
| 5,573,105 A | 11/1996 | Palmaer |
| 5,649,617 A * | 7/1997 | Fortenbery et al. .... 198/781.03 |
| 5,918,728 A | 7/1999 | Syverson |
| 5,984,084 A | 11/1999 | Osaka et al. |
| 5,988,362 A | 11/1999 | Nakamura et al. |
| 6,125,993 A * | 10/2000 | Hansson ..................... 198/788 |
| 6,244,427 B1 * | 6/2001 | Syverson .................... 198/788 |
| 6,523,665 B2 | 2/2003 | Nimmo et al. |
| 2003/0192769 A1 | 10/2003 | Cotter et al. |

FOREIGN PATENT DOCUMENTS

| | | |
|---|---|---|
| GB | 2074119 A * | 10/1981 |
| JP | 09058829 A2 | 3/1997 |
| JP | 2003072927 A2 | 3/2003 |

* cited by examiner

TAPERED SPLINE ROLLER FOR CURVED ROLLER CONVEYOR

CROSS-REFERENCE TO RELATED APPLICAITONS

This application claims the benefit of U.S. Provisional Application No. 60/625,512, filed Nov. 5, 2004.

BACKGROUND OF THE INVENTION

Conveyor roller systems are used by the manufacturing and transport, as well as other, industries in the movement of goods. Conventional systems, such as those shown in U.S. Pat. Nos. 3,618,418 and 4,279,377, employ rollers having gear teeth or sprockets affixed to an end for engaging a chain or a toothed belt coupled to a drive motor. One conventional system disclosed in US Pat. 5,348,140 (incorporated herein by reference) provides a plurality of rollers, each having integrally-formed around the barrel portion of the roller, a plurality of radially-disposed, recessed splines configured to receive a series of lateral projections, e.g. ribs, disposed on an inner surface of a drive belt. The roller and the roller conveyor system provide a cost savings over rollers having swaged or welded gear teeth or sprockets. To advantageously accommodate design considerations, the recessed splines may be integrally-formed about the barrel portion of the roller on at least one end or intermediate the ends. The disclosed conveyor system provides only straight conveying sections.

SUMMARY OF THE INVENTION

The present invention provides an improved curved roller conveyor assembly that provides a curved conveying path, which can be incorporated into conventional roller conveying systems. The present invention relates to a tapered spline roller comprising: (a) a cylindrical barrel portion having a length and a first and second end; and (b) at least a first drive portion comprising a plurality of parallel, radially-disposed, tapered splines about the circumference of the barrel portion, intermediate the ends of the barrel portion. The splines can be integrally-formed into the barrel portion. The splines can be recessed radially inwardly from the outer surface of the barrel portion of the roller. The splines can be tapered inwardly at a taper angle toward the center of the roller, along the length of the spline, from the first end toward the second end of the roller. The roller can also comprise a circumferential recess disposed adjacent to at least one end of the tapered splines, where the circumferential recess preferably overlaps the ends of the tapered splines. Preferably, the circumferential recess is disposed at each end of each of the tapered splines. More typically, the roller comprises a second drive portion adjacent to and axially disposed from the first drive portion. The taper angle of the splines of the first drive portion can be different than the taper angle of the splines of the second drive portion.

The present invention also relates to a curved roller conveyor assembly comprising: (a) a pair of curved frame members; (b) a plurality of radially-arranged, spaced-apart tapered spline rollers, extending between and axially connected with the curved frame members, the tapered spline roller comprising: (1) a cylindrical barrel portion having a length and a first and second end, and (2) at least a first drive portion comprising a plurality of parallel, radially-disposed, tapered splines about the circumference of the barrel portion, intermediate the ends of the barrel portion; (c) at least one connecting belt, the belt engaging the tapered splines of two adjacent rollers for rotationally coupling the rollers; and (d) a drive rotationally coupled to at least one of the tapered spline rollers for imparting rotational motion. The conveyor assembly typically employs tapered spline rollers that comprise a second drive portion adjacent to and axially disposed from the first drive portion. The connecting belt typically has an inner surface having spaced-apart ribs for engaging a plurality of slots disposed between the tapered splines of the rollers. The conveyor drive can be coupled to at least one of the tapered spline rollers by a drive belt that has an inner surface having spaced-apart ribs that engage the plurality of slots disposed between the tapered splines of the roller. The drive can be a drive motor that powers a drive shaft connected to the drive belt. The drive shaft itself can have a driving portion that can also comprise a plurality of parallel, radially-disposed splines configured with slots there between to receive the ribs of the drive belt. The drive can also be a self-powered, tapered spline roller. The tapered splines are typically formed integrally into the roller barrel, by crimping. More typically, the splines are recessed radially inwardly from the outer surface of the barrel portion, and are tapered inwardly at a taper angle toward the center of the roller, along the length of the spline, from the first (or radially inner) end toward the second (or radially outer) end. Preferably, the tapered spline roller also comprises a circumferential recess disposed adjacent to an end, and more preferably both ends, of the tapered splines. In a preferred embodiment, the first drive portion of a first roller is rotationally coupled to the first drive portion of an adjacent second roller, and the second drive portion of the first roller is rotationally coupled to the second drive portion of an oppositely-adjacent third roller. The tapered splines of the first drive portions can have a taper angle $\alpha$ that is one-half of the angle $\gamma$ formed between the centerlines of the first roller and adjacent second roller, and the tapered splines of the second drive portions can have a taper angle $\beta$ that is one-half of the angle $\theta$ formed between the centerlines of the first roller and adjacent third roller.

The present invention also relates to a method for forming a tapered spline roller, comprising the steps of: (a) providing a cylindrical barrel having a length, and a first and second end; (b) forming a first drive portion by forming a plurality of parallel, radially-disposed, tapered splines about the circumference of the barrel portion, intermediate the ends of the barrel. The method further comprises, after step (a), the step (a') of forming at least one circumferential recess in the barrel, and wherein an end of the tapered spline of step (b) is formed over the circumferential recess. The radially-disposed, integrally-formed splines can be formed by crimping, and are preferably recessed radially inwardly from the outer surface of the barrel portion, typically at a taper angle toward the center of the roller, along the length of the spline, from the first end toward the second end. The method can further comprise the step (c) of forming a second drive portion adjacent to and axially disposed from the first drive portion.

These and other features will be readily apparent to those skilled in the art based upon the disclosure contained herein.

DETAILED DESCRIPTION OF THE INVENTION

Figure 1:
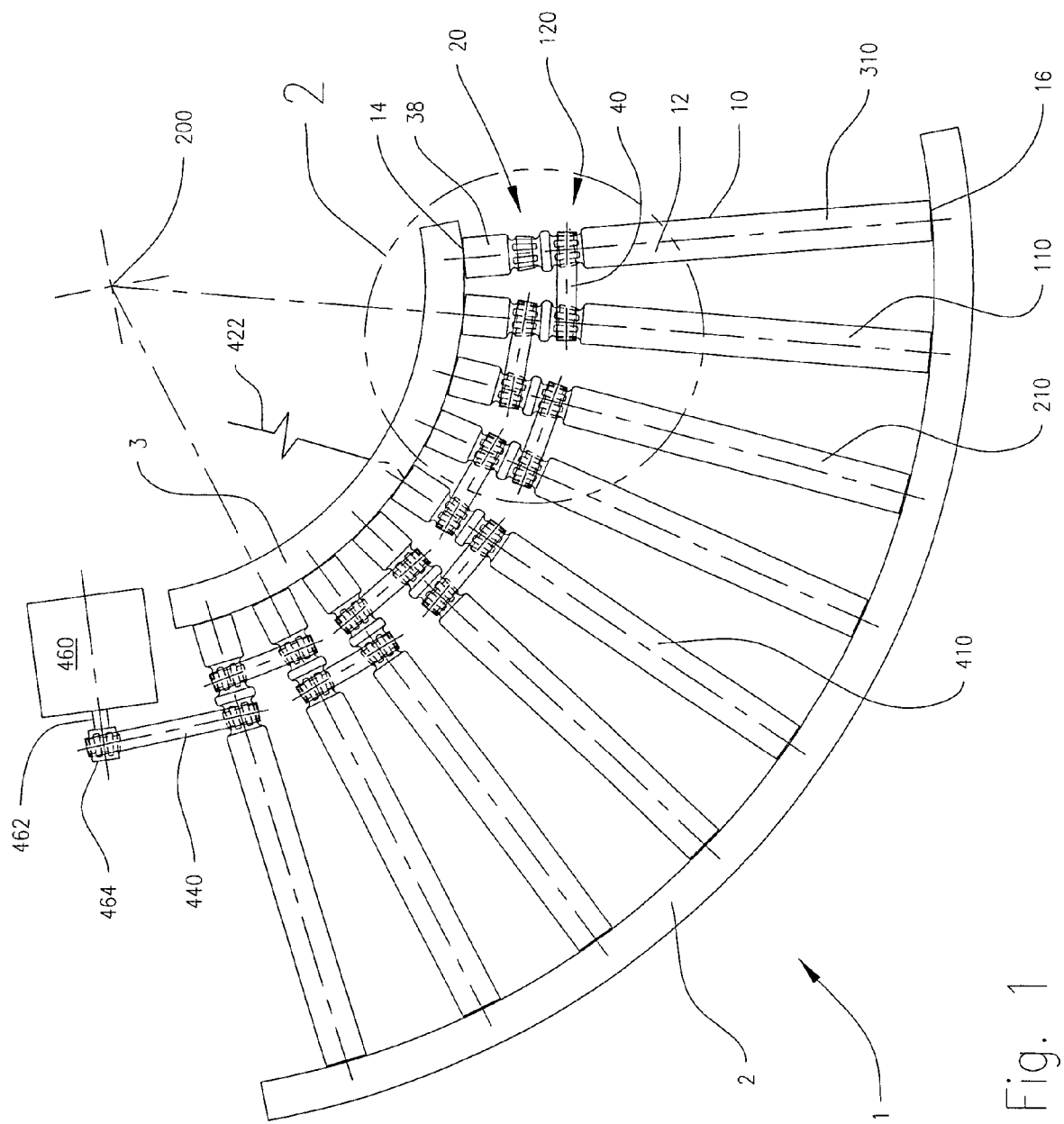
FIG. 1 shows a plan view of a curved roller conveyor assembly having a plurality of radially-disposed tapered spline rollers.

Referring initially to FIG. 1, a curved roller conveyor assembly 1 according to the present invention. The roller conveyor is shown having a curved conveying path that is radially displaced from a focus point 200. The conveying assembly includes a pair of spaced-apart frame members, shown as outer frame 2 and inner frame 3. Typically the distance between the inner and outer frames, or width of the conveying path, projected along lines radiating from focus point 200, is the same length.

Positioned between the pair of frames 2 and 3 are a plurality of the tapered spline rollers 10. In the illustrated embodiment, the rollers 10 are positioned along centerlines 100 radiating from the focus point 200. The rollers 10 have a first or inner end 14, disposed adjacent to and rotationally affixed to the inner frame 3, and a second or outer end 16, disposed adjacent to and rotationally affixed to the outer frame 2. The rollers 10 can be affixed to the frames conveniently with hexagonal fasteners. The size, number and spacing between adjacent rollers are a design consideration, depending upon the size and shape of particular articles that are to be conveyed along the top surfaces of the rollers.

The rollers 10 have one or more drive portions 20 disposed intermediate the ends 14 and 16 of the roller, along the length of the barrel portion 12. Typically, the drive portions are disposed proximate to one end or the other of the rollers. In the illustrated embodiment, the drive portions 20 are disposed proximate the inner frame 3, with a main barrel portion 12 outboard of the drive portion 20, and a minor barrel portion 38 inboard of and between the drive portion 20 and the inner frame 3.

A plurality of connecting belts 40 are positioned around the inner drive portions 20, and around the outer drive portions 120, between adjacent rollers. The belts can be formed of an elastomeric material such as rubber, neoprene, a nylon, or of a composite material such as a reinforced rubber, neoprene, and nylon. Belts formed of an elastomeric or composite material are commercially available and are preferred over metal link chain inasmuch as elastomeric belts are quieter and generally allow for much higher conveyor speeds. Moreover, elastomeric or composite belts facilitate conveyor assembly by positioning the belts around adjacent and successive pairs of rollers prior to their positioning and installation into the curved frame members 2 and 3.

Figure 2:
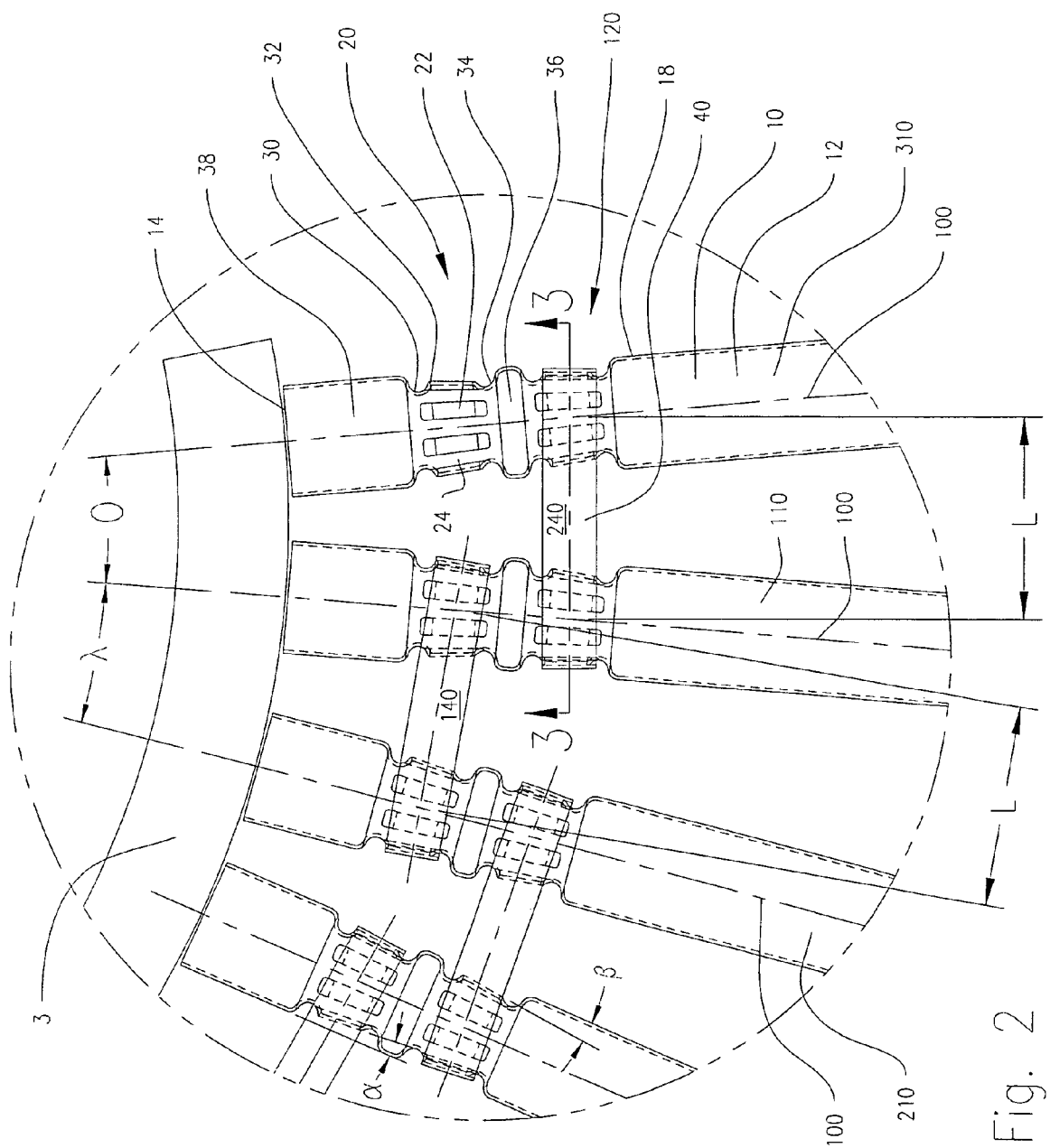
FIG. 2 shows the exploded plan view of the drive portions of the tapered spline rollers of FIG. 1.

FIG. 2 shows an exploded view of the inner end 14 and drive portions of several rollers 10. Each roller 10 is shown wherein its centerline 100 is aligned through the focus point 200, shown in FIG. 1. Each illustrated roller 10 has an inner drive portion 20 and an outer drive portion 120. In the illustrated roller, the drive portions 20 and 120 are formed integrally with the cylindrical barrel portion 12 of the roller. The drive portion 20, 120 is formed of a plurality of parallel, radially-disposed, tapered splines 22 disposed about the circumference of the roller, intermediate the main barrel portion 12 and the end barrel portion 38. The integrally-formed splines 22 are typically formed into the barrel portion.

Figure 3:
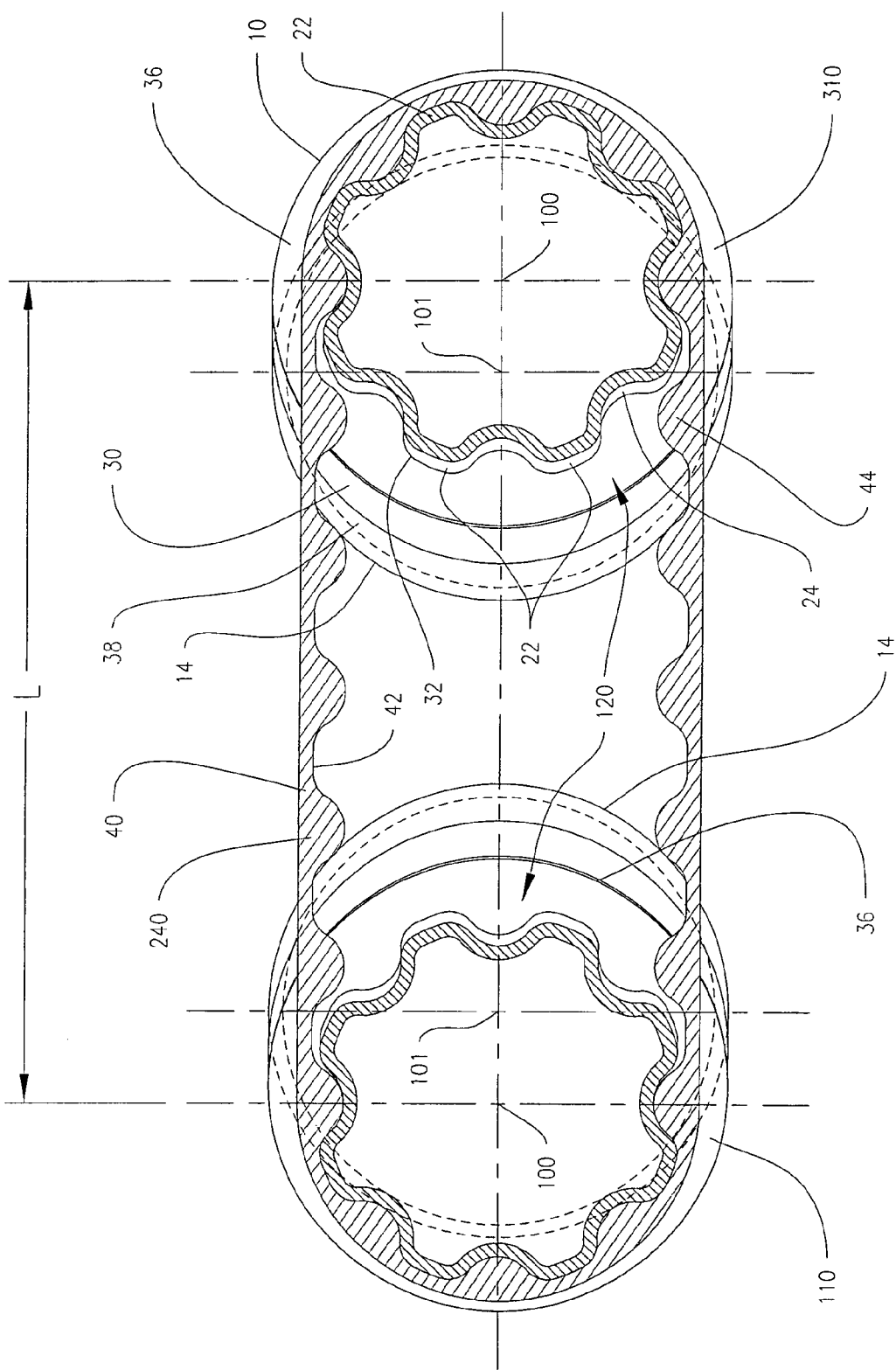
FIG. 3 shows an elevation cross-section through the drive portion and belt of the rollers, taken through line 3-3 of FIG. 2.

As also shown in FIG. 3, the tapered splines 22 are recessed radially inwardly from the outer surface 18 of the barrel portion. The recessing of the splines can prevent the connecting belt 40 from extending above the conveying surface formed by the upper surfaces 18 of the conveying rollers. This enables an article to be conveyed along the roller conveyors over the drive portions of the roller without interference with the revolving belts 40.

The splines 22 are tapered inwardly at a taper angle toward the center of the roller, along the length of the spline, from the inner end 14 toward the outer end 16 of the roller. Between each pair of tapered splines 22 are slots 24 that project inward toward the centerline 100 of the roller.

The roller embodiment preferably comprises a circumferential recess 30 that is disposed adjacent an inner end 32 of the tapered splines 22. The recess can also be formed on the outer end of the splines, shown as recess 34. Typically, the tapered splines 22 are formed with their ends at or over the circumferential recesses 30 and 34. The length of the splines 22 is typically the width of the connecting belt 40. The splines 22 form a crown on which the belt 40 can ride, and which maintain alignment of the revolving belt.

The illustrated embodiment of the rollers 10 comprise a first inner drive portion 20 and a second outer drive portion 120, the outer drive portion 120 being disposed outboard of the inner drive portion 20 along the length of the barrel 12, with the drive portions 20 and 120 being separated by a spacer portion 36. As shown in FIG. 2, a roller 10 is typically associated with two separate connecting belts 40. An inner belt 140 is associated with the inner drive portions 20 of rollers 110 and 210. An outer belt 240 is associated with the outer drive portions 120 of rollers 110 and 310. It can be seen that additional connecting belts 140 and 240 alternately associate successive adjacent rollers 10.

To permit a linear belt 40 to rotationally connect the outwardly-radiating adjacent rollers 20, the splines 22 of the drive portions are inwardly tapered, whereby the crown surface of the outer splines 22 engaging the ends of the connecting belts 40 are parallel. As shown on roller 210 in FIG. 2, the tapered splines of the inner drive portion 20 have a taper angle $\alpha$, and the tapered splines of the outer drive portion 120 have a taper angle $\beta$. Preferably, the taper angle a is one-half of the angle $\gamma$ formed between the centerlines 100 of inner-belt coupled rollers 110 and 120, and the taper angle $\beta$ is one-half of the angle $\theta$ formed between the centerlines 100 of outer-belt coupled rollers 110 and 310. When the connecting belts 140 and 240 are of equal length L, as is typical, the inner taper angle $\alpha$ and the outer taper angle $\beta$ can be different, and the angle $\gamma$ formed between inner-belt coupled rollers 110 and 210 is different from the angle $\theta$ formed between outer-belt coupled rollers 110 and 310.

FIG. 3 shows a cross section of the outer drive portions 120 of adjacent rollers 110 and 310, and their associated connecting belt 240. (The interior details of the rollers 110 and 310 have been omitted from the figures.) The view demonstrates that the ends 14 of the adjacent rollers 110 and 310 are angled radially inwardly toward focus point 200 (shown in FIG. 1), such that their respective centerlines 100 pass through the centerpoints 101 of the roller ends 14. The belt 240 has an inner surface 42 having a plurality of spaced apart ribs 44 which are configured to register with the slots 24 of the drive portions 120 of the adjacent rollers 110 and 310. The pitch of the splines 22 of the drive portions is selected to equal the pitch of the ribs 44 of the drive belt 40. Alternatively, provided that the tensioning of belt 40 between a pair of tapered spline rollers provides sufficient grip, a connecting belt 40 having a smooth inner surface could be used.

Referring to the Figures, an example embodiment of the invention provides a curved roller conveyor has 14 rollers and 13 connecting belts through a 90° turn. The inner radius of the curve is 18 inches (45.7 cm), measured to the inner end 14 of the rollers. A standard 2.5 inch ribbed drive belt is used (available from T.K.F., Inc., model #4202-0250), having 2.5 inch (6.35 cm) roller centers. The rollers are 24 inches (61 cm) wide, with the first and second driver portions positioned near the inner end 14 of the rollers. The centers of the inner belt 140 and outer belt 240 are positioned 21 inches (53.34 cm) and 23⅛ inches (58.74 cm) from the focus point 200, respectively. The geometry of the assembly dictates that the inner taper angle a of the tapered splines 22 of the inner drive portion 20 is 3.3923°, and the outer taper angle β of the tapered splines 22 of the outer drive portion 120 is 3.0819°. The angular distance between adjacent rollers having a belt 40 connecting the inner drive portions 20 is 6.7845° (2×3.3923°), and the angular distance between adjacent rollers having a belt 40 connecting the outer drive portions 120 is 6.1638° (2×3.0819°).

The rollers of the conveyor assembly can be driven by a variety of means. In one embodiment, a tapered spline roller 20 can be configured with a self-powered drive mechanism, shown as a self-powered master roller 410 in FIG. 1 supplied with electrical power 422, which can drive adjacent rollers rotationally connected thereto. An example of a self-powered roller can be found in US Patent 6,450,325, incorporated herein by reference. The driven adjacent rollers then in turn drive successive, rotationally-connected rollers. Alternatively, also as shown in FIG. 1, the drive can be a drive motor, 460 that powers a drive shaft 462, which is turn in connected, directly or indirectly, to a drive belt 440. Depending upon design considerations, drive motor 460 can be coupled to a gear reducer (not shown) to reduce roller speed and to increase driving torque. The drive belt can also be driven by a splined driving portion, such as the tapered spline drive 464, which comprises a plurality of parallel, radially-disposed splines, configured with slots there between to receive the ribs of the drive belt.

The invention also relates to a method for forming the tapered spline roller. The method starts with a length of a conventional tubular roller barrel, having a first and second end. The crimping die, configured in two or more die parts, has a plurality of slot-shaped teeth projecting inwardly and having a taper. The crimping die is forced radially inwardly against the outer circumferential surface of the barrel to emboss or impress by crimping the plurality of tapered splines and associated slots. The formed splines are recessed radially inwardly from the outer surface of the barrel portion. Preferably, prior to crimping of the splines, a circumferential recess is formed into the barrel at a position under each end of the tapered spline. The recess ensures that the length of the tapered spline forms a crown on which the connecting belt 40 can ride and remain aligned upon. More preferably, a second drive portion is also formed adjacent to the first drive portion, to form a preferred tapered spline roller as discussed above.

While specific embodiments of the apparatus and method of the present invention have been described, it will be apparent to those skilled in the metalworking arts that various modifications thereto can be made without departing from the spirit and scope of the present invention as defined in the appended claims.

We claim:

1. A tapered spline roller comprising:
   (a) a cylindrical barrel having a length, an outer surface, and a first and second end; and
   (b) at least a first drive portion formed integrally into a first portion of the outer surface of the barrel, and a second drive portion formed integrally into a second portion of the outer surface of the barrel, adjacent to and axially disposed from the first drive portion, each of the at least first drive portion and the second drive portion comprising a plurality of parallel, radially-disposed, tapered splines positioned about the circumference of the barrel portion, each of the plurality of tapered splines having a first end, a second end, and a length therebetween, and being tapered inwardly along its length from the first end to the second end at a taper angle toward the centerline of the roller, and wherein the taper angle of the plurality of tapered splines of the first drive portion is different than the taper angle of the plurality of tapered splines of the second drive portion.

2. The tapered spline roller of claim 1 wherein at least the second ends of the plurality of tapered splines are recessed radially inwardly from the outer surface of the barrel.

3. The tapered spline roller of claim 1, further having a circumferential recess disposed adjacent at least the second ends of the plurality of tapered splines, the circumferential recess being recessed inwardly toward the centerline of the roller a distance greater than the recess of the second ends of the plurality of tapered splines.

4. The tapered spline roller of claim 3, wherein the first ends of the plurality of tapered splines are recessed radially inwardly from the outer surface of the barrel, and having a second circumferential recess disposed adjacent the first ends of the plurality of tapered splines, the second circumferential recess being recessed inwardly toward the center of the roller a distance greater than the recess of the first ends of the plurality of tapered splines.

5. The tapered spline roller of claim 3, wherein each of the plurality of tapered splines has a crown along its length.

6. A curved conveyor roller assembly comprising:
   (a) a pair of curved frame members;
   (b) a plurality of radially-arranged, spaced-apart tapered spline rollers that include at least adjacent first and second tapered spline rollers, extending between and axially connected with the curved frame members, each of the plurality of tapered spline rollers comprising:
      (1) a cylindrical barrel having a length, an outer surface, and a first and second end, and
      (2) at least a first drive portion formed integrally into a first portion of the outer surface of the barrel, and a second drive portion formed integrally into a second portion of the outer surface of the barrel, adjacent to and axially disposed from the first drive portion, each of the first drive portion and the second drive portion comprising a plurality of parallel, radially-disposed, tapered splines positioned about the circumference of the barrel, each of the plurality of tapered splines having a first end, a second end, and a length therebetween, and being tapered inwardly along its length from the first end to the second end at a taper angle toward the centerline of the roller, wherein the taper angle of the plurality of tapered splines of the first drive portion is different than the taper angle of the plurality of tapered splines of the second drive portion;
   (c) at least one connecting belt, the belt engaging the plurality of tapered splines of the first drive portions of the adjacent first and second tapered spline rollers, for rotationally coupling said tapered spline rollers; and (d) a drive rotationally coupled to at least one of the first and second tapered spline rollers for imparting rotational motion.

7. The curved conveyor roller assembly of claim 6 wherein the belt has an inner surface having spaced-apart ribs for engaging a plurality of slots disposed between the plurality of tapered splines of the first and second tapered spline rollers.

8. The curved conveyor roller assembly claim 6 wherein the drive is coupled to the at least one of the first and second tapered spline rollers by a drive belt having an inner surface having spaced-apart ribs for engaging a plurality of slots between the plurality of tapered splines of said at least one tapered spline roller.

9. The curved conveyor roller assembly of claim 8 wherein the drive is a self-powered, tapered spline roller.

10. The curved conveyor roller assembly of claim 6 wherein at least the second ends of the plurality of splines are recessed radially inwardly from the outer surface of the barrel.

11. The curved conveyor roller assembly of claim 6, wherein the plurality of tapered spline rollers further comprises a third tapered spline roller oppositely-adjacent to the first tapered spline roller, and a second belt engaging the plurality of tapered splines of the second drive portions of the first tapered spline roller and the third tapered spline roller.

12. The curved conveyor roller assembly of claim 11, wherein the tapered splines of the first drive portions of the first and second tapered spline rollers have a taper angle α that is one-half of the angle formed between the centerlines of the first tapered spline roller and the second tapered spline roller, and wherein the tapered splines of the second drive portions of the first and third tapered spline rollers have a taper angle β that is one-half of the angle formed between the centerlines of the first tapered spline roller and the adjacent third tapered spline roller.

13. The curved conveyor roller assembly of claim 6, each of the tapered spline rollers further having a circumferential recess disposed adjacent to at least the first ends of the plurality of tapered splines, the circumferential recess being recessed inwardly toward the centerline of the roller a distance greater than the recess of the second ends of the plurality of tapered splines.

14. A method for forming a plurality of tapered splines in a conveyor roller, comprising the steps of:
(a) providing a cylindrical barrel having a length, an outer surface, and a first and second end; and (b) forming in a first portion of the outer surface of the barrel, a first tapered spline drive, comprising the steps of:
1) forming a circumferential recess inwardly a first distance toward the centerline of the roller, and
2) forming a plurality of parallel, radially-disposed, tapered splines about the circumference of the barrel, each of the plurality of tapered splines having a first end, a second end that intersects the circumferential recess, and a length therebetween and being tapered inwardly along its length from the first end to the second end at a taper angle toward the centerline of the roller, wherein the circumferential recess is recessed a distance greater than the recess of the formed second ends of the plurality of tapered splines.

15. The method of claim 14 wherein the plurality of radially-disposed, integrally-formed splines are formed by crimping.

16. The method of claim 14, further comprising the step (c) of forming a second tapered spline drive in a second portion of the outer surface adjacent to and axially disposed from the first drive portion.

17. The method of claim 16, wherein the taper angle of the plurality of tapered splines of the first tapered spline drive is different than the taper angle of the plurality of tapered splines of the second tapered spline drive.

18. The method of claim 14, wherein the step of forming a circumferential recess further comprises forming a second circumferential recess spaced axially from the first circumferential recess, wherein, in the step of forming a plurality of parallel, radially-disposed, tapered splines, the first end intersects the second circumferential recess, and the second circumferential recess is recessed a distance greater than the recess of the formed first ends of the plurality of tapered splines.

19. The method of claim 18, further comprising the step (c) of forming a second tapered spline drive in a second portion of the outer surface adjacent to and axially disposed from the first drive portion.

20. The method of claim 19, wherein the taper angle of the plurality of tapered splines of the first tapered spline drive is different than the taper angle of the plurality of tapered splines of the second tapered spline drive.

* * * * *

UNITED STATES PATENT AND TRADEMARK OFFICE
CERTIFICATE OF CORRECTION

PATENT NO.        : 7,306,091 B2                                            Page 1 of 1
APPLICATION NO. : 11/268335
DATED             : December 11, 2007
INVENTOR(S)       : Ronald L. Eubanks et al.

It is certified that error appears in the above-identified patent and that said Letters Patent is hereby corrected as shown below:

Claim 6, (b) (2), Col. 6 line 47, delete "at least".

Signed and Sealed this

Twenty-ninth Day of April, 2008

JON W. DUDAS
*Director of the United States Patent and Trademark Office*